US006489039B2

(12) United States Patent
Yoshie

(10) Patent No.: US 6,489,039 B2
(45) **Date of Patent: *Dec. 3, 2002**

(54) RECYCLABLE IMAGE-RECORDING MEDIUM, METHOD FOR MANUFACTURING THE SAME, AND METHOD FOR REMOVING PRINTED MATERIAL FROM THE IMAGE-RECORDING MEDIUM

(75) Inventor: Naoki Yoshie, Kyoto (JP)

(73) Assignee: Minolta Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/195,704

(22) Filed: Nov. 19, 1998

(65) Prior Publication Data

US 2002/0098342 A1 Jul. 25, 2002

(30) Foreign Application Priority Data

Nov. 25, 1997 (JP) ........................................ 9-322954
Jun. 29, 1998 (JP) ........................................ 10-182109

(51) Int. Cl.[7] ........................................ B32B 27/08

(52) U.S. Cl. .................... 428/530; 428/423.1; 428/480; 428/526; 428/537.5; 428/195; 427/198

(58) Field of Search ................................ 428/500, 526, 428/530, 532, 537.5, 480, 423.1, 195; 427/198

(56) References Cited

U.S. PATENT DOCUMENTS

| | | | | |
|---|---|---|---|---|
| 5,204,379 A | * | 4/1993 | Kubota et al. | 522/96 |
| 5,876,847 A | * | 3/1999 | Mitsuhashi et al. | 428/336 |

FOREIGN PATENT DOCUMENTS

| | | |
|---|---|---|
| EP | 601 502 A2 | 6/1994 |
| JP | 7-140554 | 2/1995 |
| JP | 7-311523 | 11/1995 |

* cited by examiner

*Primary Examiner*—Paul Thibodeau
*Assistant Examiner*—Christopher Paulraj
(74) *Attorney, Agent, or Firm*—Burns, Doane, Swecker & Mathis, LLP

(57) ABSTRACT

The present invention related to a recyclable image-recording medium comprising a base layer, an intermediate layer and a water-swelling surface layer; a manufacturing method of the recyclable image-recording medium; and a printed material-removing method that uses such an image-recording medium.

22 Claims, 5 Drawing Sheets

RECYCLABLE IMAGE-RECORDING MEDIUM, METHOD FOR MANUFACTURING THE SAME, AND METHOD FOR REMOVING PRINTED MATERIAL FROM THE IMAGE-RECORDING MEDIUM

This application is based on application(s) No. Hei 09-322954 and Hei 10-182109 filed in Japan, the contents of which are hereby incorporated by reference.

BACKGROUND OF THE INVENTION

1. Field of the Invention

The present invention relates to an image-recording medium capable of being reused repeatedly wherein a printed material made to adhere to the image-recording medium by image formation in a copying machine, a printer, or the like is removable from the image-recording medium. More particularly, the present invention relates to an image-recording medium suitable for being applied to a removing means by physical frictional forces, such as a brushing method that uses an aqueous solvent, and also relates to a method of manufacturing such an image-recording medium and a method for removing the printed material from the image-recording medium by physical frictional forces such as brushing.

2. Description of the Related Art

Electrophotographic copying techniques using toners (so called copy simply) are popular now. Image-recording media such as paper and OHP sheets are used in large quantities.

Printed materials printed or copied on such image-recording media are not easily removed. Techniques for removing such printed materials are not yet ready for practical use. It is true that printed materials generated in large quantities in offices are discarded when they become unnecessary.

This is clearly not desirable from the point of view of environmental protection and natural resource preservation. Therefore, researches on techniques for reproducing or recycling image-recording media which would otherwise be discarded have been vigorously conducted. Japanese Patent Laid-Open No. Hei 7-311,523 and EP060152, for example, disclose methods wherein a swelling layer which swells by absorbing water is formed on the surface of an image-recording medium and images printed on the image-recording medium are removed by swelling the swelling layer with water.

In reality, however, the conventional methods have not been put into practical use, because of their inability to sufficiently and satisfactorily remove printed materials and because of problems involving the durability of the image-recording medium.

In particular, the surface layer changes its volume by absorbing water while the volume of the base layer remains unchanged, and also the surface layer is subjected to a stress by physical force applied to remove the printed material on the swollen surface layer. Because of these reasons etc., the surface layer tends to be peeled off. It is an important technical subject to fix the water-swelling surface layer on the base layer.

SUMMARY OF THE INVENTION

An object of the present invention is to provide a novel and useful recyclable image-recording medium that allows printed materials such as toners adhering thereto to be removed.

It is also an object of the present invention to provide a recyclable image-recording medium having excellent durability.

A further object of the present invention is to provide a method of manufacturing such an image-recording medium and a printed material-removing method that uses such an image-recording medium.

The present invention provides a recyclable image-recording medium comprising a base layer, an intermediate layer and a water-swelling surface layer; a manufacturing method of the recyclable image-recording medium; and a printed material-removing method that uses such an image-recording medium.

DETAILED DESCRIPTION OF THE INVENTION

Figure 1:
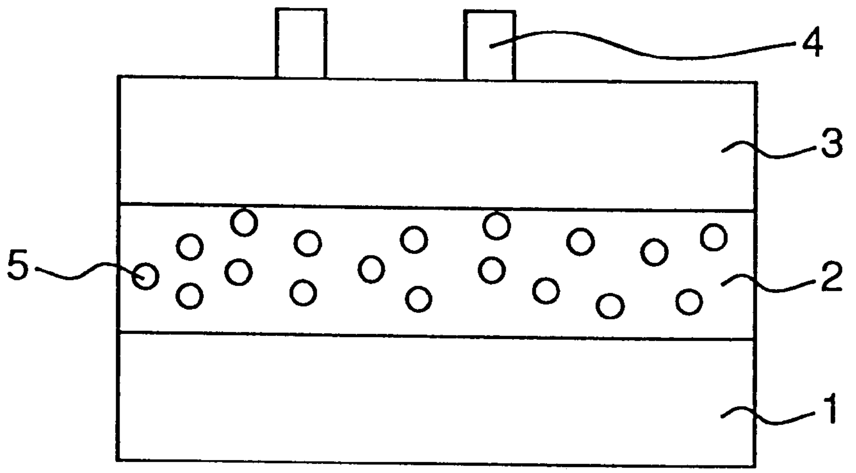
FIG. 1 is a schematic cross sectional view of an image-recording medium.

A first invention of the present application relates to a recyclable image-recording medium comprising:

a base layer;

an intermediate layer; and a water-swelling surface layer;

in which the intermediate layer comprises a reactive compound having a functional group chemically bondable to the surface layer (hereinafter referred to simply as a "reactive compound").

According to the invention, a novel and useful recyclable image-recording medium is provided that allows the printed material recorded on the surface layer to be removed by swelling the surface layer with water. Because the intermediate layer contains a reactive compound having a functional group chemically bondable to the surface layer, the surface layer is adhered strongly to the intermediate layer, preventing the surface layer from peeling off. Accordingly, the image-recording medium of this invention has excellent durability.

The intermediate layer may be formed from a material containing an adhesive resin in addition to the reactive compound. When the adhesive resin is used in combination with the reactive compound, the surface layer can be fixed more firmly.

The reactive compound may be in a solid form at normal temperatures or in a viscous liquid form at normal temperatures. The use of such a reactive compound facilitates the formation of a uniform layer.

The surface layer can be formed of a material containing a water-swelling resin produced by crosslinking a water-soluble resin. The water-soluble resin may be crosslinked using a crosslinking agent. The same compound as the crosslinking agent used for forming the surface layer may be used as the reactive compound to be added to the intermediate layer. Further, the surface layer may be formed of a material containing a water-soluble resin and a component insoluble in water.

Fine particles may be added to either the surface layer or the intermediate layer or to both. The addition of the particles is effective in improving printing and writing properties, etc.

A second invention of the present application a recyclable image-recording medium comprising:

a base layer;

an adhesive intermediate layer on the base layer; and a surface layer comprising a water-swelling resin on the intermediate layer;

the surface layer being formed by using an aqueous solution containing a water-soluble resin dissolved and/or dispersed therein.

According to this invention, a novel and useful recyclable image-recording medium is provided that allows the printed material recorded on the surface layer to be removed by swelling the surface layer with water. The adhesive intermediate layer works to adhere the surface layer to the base layer, resulting in prevention of the surface layer from peeling off, and resulting improvement of durability. Furthermore, since the surface layer is formed using an aqueous material, no organic solvent remains within the surface layer, resulting in prevention of the generation of organic solvent gases from the image-recording medium.

The intermediate layer may be formed using an aqueous solution containing an adhesive resin material dissolved and/or dispersed therein. Further, the intermediate layer may be formed from an aqueous solution containing an aqueous or aqueous-emulsifying hydrophilic reactive compound having a functional group chemically bondable to the resin contained in the surface layer. When the intermediate layer is formed of an aqueous material, no organic solvent remains within the intermediate layer, resulting in more effective prevention of the generation of organic solvent gases from the image-recording medium.

The water-soluble resin contained in the surface layer may be crosslinked with a water-soluble or hydrophilic crosslinking agent. A water-insoluble component, obtained by polymerizing a water-soluble or hydrophilic polymerizable monomer and/or polymerizable oligomer, may be contained in the water-soluble resin in the surface layer.

A third invention of the present application relates to a method of manufacturing a recyclable image-recording medium, comprising the steps of:

forming an intermediate layer on a base layer by using a first solution containing a reactive compound; and forming a water-swelling surface layer on the intermediate layer by using a second solution containing a water-soluble resin chemically bondable to a functional group contained in the reactive compound. According to this invention, a novel and useful method for manufacturing a recyclable image-recording medium is provided. In this invention, by forming the intermediate layer using the first solution containing the reactive compound, and forming the surface layer using the second solution containing the water-soluble resin material, a recyclable image-recording medium having excellent durability can be readily obtained. When a reactive compound that is in a solid form or in a viscous liquid form at normal temperatures is used, the formation of the intermediate layer and surface layer becomes easy.

A fourth invention of the present application relates to a method of manufacturing a recyclable image-recording medium, comprising the steps of:

forming an intermediate layer on a base layer by using an adhesive material; and forming a water-swelling surface layer on the intermediate layer by using an aqueous solution containing a water-soluble resin dissolved and/or dispersed in water. According to this invention, a novel and useful manufacturing method for a recyclable image-recording medium is provided. In this invention, by forming the surface layer using an aqueous material, not only an image-recording medium having excellent durability can be obtained easily and safely, but also organic solvents can be prevented from remaining in the image-recording medium.

The intermediate layer may be formed using an aqueous solution containing an adhesive resin material dissolved and/or dispersed therein. The intermediate layer may be formed from an aqueous solution containing a water-soluble or hydrophilic reactive compound having a functional group chemically bondable to the resin contained in the surface layer. When the intermediate layer is formed from an aqueous material, the easiness and safety of the manufacturing process is further enhanced. Since no organic solvent remains within the intermediate layer, the generation of organic solvent gases from the image-recording medium can be prevented more effectively.

A fifth invention of the present application relates to a method for removing a printed material from an image-recording medium, comprising the steps of: supplying an aqueous solvent to the surface layer of the image-recording medium with the printed material printed thereon; and removing the printed material from the swollen surface layer by means of a physical frictional force. According to this invention, a novel and useful printed material removing method is provided. Since the surface layer is adhered to the base layer through the intermediate layer, a sufficient physical frictional force can be applied to the surface layer to remove the printed material satisfactorily. At the same time, the peeling-off of the surface layer and/or the intermediate layer from the base layer can be prevented.

FIG. 1 is a schematic cross sectional view of one embodiment of an image-recording medium according to the present invention. Reference number 1 is a base layer, 2 is an intermediate layer, 3 is a surface layer, and 5 is a reactive compound. In the structure shown in FIG. 1, a printed material 4 is printed on the surface of the surface layer 3. In the structure shown in FIG. 1, the intermediate layer 2 and the surface layer 3 are formed on one side of the base layer 1. Alternatively, the intermediate layer 2 and the surface layer 3 may be formed on both sides thereof.

As a base layer 1, a plastic film that has water-resistance (strength) and at least whose surface is transparent, or a plastic film opacified by adding inorganic fine particles, is used advantageously. The material of the plastic film is not specifically limited. When heat resistance and other properties are considered, polyester, polycarbonate, polyimide, polymethyl methacrylate, etc. are preferred. When versatility, price, durability, etc. are further considered, polyester, in particular, polyethylene terephthalate (PET), polyethylene naphthalate (PEN), etc. are desirable. Various sheets available as OHP sheets can also be used. In addition, plastic-based paper and other synthetic paper made from plastic fibers such as PET fibers are available in the market. These paper sheets can be used as the base material. Metal foils, paper with improved water-resistance, and even composite materials made from resin, paper, and metal can also be used. The essential requirement in the invention is that the material should have water-resistance and appropriate mechanical strength and should be able to keep its flatness throughout the printing and removal of printed materials.

The intermediate layer 2 is formed from a resin with high adhesive properties. The intermediate layer contains a compound (reactive compound) 5 having a functional group chemically bondable to the surface layer-forming resin.

Examples of the resin with high adhesive properties for forming the intermediate layer 2 include acrylate resins, styrene resins, polyester resins, polycarbonate resins, vinyl acetate resins, vinyl chloride resins, urethane resins, etc. among which polymethyl methacrylate resins, polyester resins, polycarbonate resins, vinyl chloride resins, and urethane resins are preferable. In particular, resins having high adhesivity to the base layer are preferred for use.

The reactive compound contained in the intermediate layer is not limited to a specific compound as long as it has a functional group capable of chemically bonding to the surface layer-forming resin. For example, methylol compounds, isocyanate compounds, aldehyde compounds, epoxy compounds, aziridine compounds, etc. can be used. When the surface layer-forming resin is a resin having a hydroxyl group, such as polyvinyl alcohol or methyl cellulose, methylol compounds, isocyanate compounds, aldehyde compounds, and epoxy compounds are preferred. When the surface layer-forming resin is a resin having a carboxyl group, such as polyacrylic acid, then isocyanate compounds, epoxy compounds, and aziridine compounds are preferred.

Examples of methylol compounds include methylol melamines such as dimethylol melamine and trimethylol melamine, dimethylol ureas, and melamine-formaldehyde resins. Various other methylol compounds can also be used; those having a appropriately high molecular weight and appropriately long molecular chain are more preferable. From this point of view, melamine-formaldehyde resins are most preferable among the above listed methylol compounds.

Examples of aldehyde compounds include glyoxal and glutaraldehyde. Various other aldehyde compounds can also be used.

Examples of epoxy compounds include polyethylene glycol diglycidyl ether, polypropylene glycol diglycidyl ether, sorbitol polyglycidyl ether, sorbitan polyglycidyl ether, and polyglycerol polyglycidyl ether. Various other epoxy compounds can also be used.

For isocyanate compounds, a compound containing two or more isocyanate groups within one molecule can be used. Using a compound containing a plurality of isocyanate groups, the base layer and the surface layer can be bonded together more firmly.

Such isocyanates include, for example, 4,4'-diphenylmethane di-isocyanate (melting point: 39° C.), 4,4'-methylene biscyclohexyl isocyanate (melting point: 45° C.), tris(p-isocyanatephenyl)thiophosphate, tris(p-isocyanatephenyl) methane, adduct of trimethylolpropane with three tolylene di-isocyanates, and aliphatic polyisocyanates containing a hydrophilic group within molecule.

The isocyanates used in the present invention, including the above listed compounds, may be protected by phenol, sulfurous acid, etc.

Examples of aziridine compounds include, for example, diphenylmethane-bis-4,4'-N,N'-diethyl urea and 2,2-bishydroxylmethylbutanol-tris-[3-(1-aziridinyl)propionate]. Polymers containing an oxazoline group can also be used.

For the above described reactive compounds, compounds that are in the form of a solid or wax at normal temperatures or in the form of a viscous liquid at normal temperatures may be used. When the reactive compound is in the form of a solid or wax or a viscous liquid at normal temperatures, the advantage is that the compound does not evaporate by drying in the process of forming the intermediate layer and, also, the surface does not become sticky after drying, which makes the surface coating easier. Further, when the reactive compound soluble in water or having affinity for water is used, there is no need to use an organic solvent when forming the intermediate layer, which serves to prevent an organic solvent from remaining in the intermediate layer.

In order to apply the intermediate layer 2 onto the base layer 1, a solution-coating method, a melt-coating method etc. can be employed. In the solution-coating method, a solution prepared by dissolving the resin and the reactive compound in a suitable solvent, such as tetrahydrofuran (THF), dioxane, acetone, ethyl acetate or methyl ethyl ketone (MEK), is applied and dried. A solution of a water-soluble or hydrophilic polyurethane, polyester, or other resin dispersed or dissolved in water can also be used. Such resin solutions and resin emulsions are commercially available. Such solutions or emulsions have the advantage that the coating can be performed without use of an organic solvent, especially, a nonaqueous organic solvent. This effects to improve the safety during manufacturing. This also effects to prevent problems such as generation of residual solvent gases from within the image-recording medium when it is fed, for example, into a copying machine and heated. The use of an aqueous solvent has an effect of facilitating the application of the intermediate layer when a surface active agent is added. By means of the solution-coating method or the melt-coating method described above, the intermediate adhesive layer is formed to have a layer thickness of about 0.5 $\mu$m to 20 $\mu$m, preferably about 0.5 $\mu$m to 10 $\mu$m, more preferably about 0.5 $\mu$m to 6 $\mu$m. If the thickness is less than 0.5 $\mu$m, coating irregularities tend to occur, tending to result in the formation of uncoated portions. If the thickness exceeds 20 $\mu$m, problems may arise in strength and heat resistance etc. of the image-recording medium.

The reactive compound can itself be dissolved in a solvent or the like and then applied and dried for formation of the intermediate layer, when it is a high molecular weight compound that has a layer-forming capability by itself and excellent adhesivity to the base layer. When adding the compound to the resin solution for coating, 5 to 50 parts by weight of the reactive compound may be added per 100 parts by weight of the intermediate layer-forming resin.

At the process stage where the intermediate layer is applied, part of the reactive compound remains in the resin, and it is believed that the remaining compound acts as an effective component. Further the intermediate layer may be subjected to a corona discharge treatment.

When paper or fibrous base is used, the base may be immersed in a coating solution for formation of the intermediate layer, thereby impregnating the base material with the coating solution and filling the intermediate layer-forming material through fibers of the base material.

By providing the above structured intermediate layer between the base layer and the surface layer, when the image-recording medium is subjected to the whole processes including a liquid-application process, a swelling process, and a printed material-removing process, the surface layer is not peeled off from the base layer but remains fixed to the base layer. The image-recording medium can thus be reused.

The surface layer 3 comprises a water-swelling resin. Water-swelling means to swell with water or an aqueous solvent but not dissolve in it. The water-swelling resin may be produced by crosslinking a water-soluble resin. A water-insoluble component may be added to a water-soluble resin to confer the properties to absorb a water or other solvent to swell without dissolving in the solvent.

A water-soluble resin containing within a molecule a functional group having active hydrogen, such as a hydroxyl group, an amino group, an amide group, a thiol group, a carboxyl group, or a sulfonic group, can be used as the above mentioned water-soluble resin, examples of which include polyvinyl alcohol, methyl cellulose, polyacrylic acid, carboxymethyl cellulose, hydroxyethyl cellulose, polyvinyl pyrrolidone, polyacrylamide, and diacetone polyacrylamide. Preferably, polyvinyl alcohol, methyl cellulose, or polyacrylic acid is used. Among them, polyvinyl alcohol containing many hydroxyl groups having high reactivity with the reactive compound is preferred, with a polymerization degree of 300 to 3,000, preferably 500 to 2,000, and more preferably 500 to 1,700. It is appropriate for use that such a water-soluble resin of 2 to 30 parts by weight, preferably 5 to 10 parts by weight, is dissolved in an aqueous solvent of 100 parts by weight.

In order to crosslink the water-soluble resin, a crosslinking agent and, if necessary, an initiator is added to the aqueous solution of the resin. Any crosslinking agent may be used as long as it has reactivity with the functional groups, such as a hydroxyl group, an amide group, a carboxyl group, etc., contained in the water-soluble resin molecules, and is capable of crosslinking the water-soluble resin. Examples include epoxy compounds, isocyanate compounds, glyoxals, methylol compounds, melamine compounds, dicarboxylic acids, aziridine, dihydrazide, etc. The same compounds as those previously listed as examples of the reactive compound added to the intermediate layer can be used.

Examples of isocyanate compounds include water-soluble aliphatic polyisocyanates containing hydrophilic groups in their molecules.

The same compounds as those used as the reactive compound added to the intermediate layer may be used as the crosslinking agent for crosslinking the surface layer. Thereby, it becomes easier to alleviate adverse effect caused at the interface between the surface layer and the intermediate layer by repeated use.

When adding the above listed compounds as the crosslinking agent, 0.1 to 100 parts by weight, preferably 1 to 50 parts by weight, is added per 100 parts by weight of the water-soluble resin. If the amount is too low, the strength of the layer when swollen may be insufficient or the layer may be dissolved. If the amount is too large, the crosslinking agent may become a bulk component, causing problems in terms of the strength of the surface layer.

When the water-soluble resin is made insoluble by adding a water-insoluble component, it is preferable that a monomer or an oligomer having two or more vinyl groups and their polymerization initiator are added to a resin solution and the insoluble component is formed by heat polymerization or ultraviolet (UV) radiation curing.

Examples of the monomer or oligomer having two or more vinyl groups include diacrylates, dimethacrylates, and urethane acrylate-based monomers or oligomers.

The amount of such a monomer or oligomer to be added is determined by considering strength of the resulting surface layer when swollen with water and easiness of printed material removal. From this viewpoint, 10 to 150 parts by weight, preferably 30 to 100 parts by weight, maybe added per 100 parts by weight of the water-soluble resin.

When a water-soluble or hydrophilic material is used as the crosslinking agent or the monomer or oligomer for forming the insoluble component, there is such an advantage as the surface layer can be formed with water. This serves to prevent an organic solvent from remaining in the surface layer, while at the same time, securing the safety during the coating process. Particularly, when the reactive compound added to the intermediate layer is water-soluble or hydrophilic, the formation of both the intermediate layer and the surface layer can be performed by use of an aqueous coating solution. The safety can be further improved, and the problem of remaining of organic solvent in the image-recording medium can be suppressed more effectively.

A surface active agent may be added to the resin solution to form the surface layer, in order to enhance the wettability and water-infiltrative properties. The surface active agent is not limited to a specific type, but various surface active agents, anionic, cationic, or non-ionic, may be used.

Inorganic fine particles, such as silica, titanium oxide, alumina, zinc oxide and calcium carbonate, or fine resin particles, such as acrylic resin, styrene resin, may be added to the surface layer to improve writing or printing properties. When such inorganic fine particles are added, 1 to 200 parts by weight, preferably 1 to 50 parts by weight, is added per 100 parts by weight of the water-soluble resin.

The average particle size of the secondary particles of these fine particles (the secondary particle size) is preferably not smaller than 5 μm and not larger than 30 μm. If the particle size is smaller than 5 μm, a discernible effect is difficult to obtain in terms of writing or printing properties. If it exceeds 30 μm, a problem on image quality may arise. The secondary particle size here refers to the particle size when an agglomerate formed of agglomerated fine particles is regarded as a single particle. The secondary particle size can be measured, for example, by means of a microscope. The fine particles described above may be added not only to the surface layer but also to the intermediate layer.

If desired, an antistatic treatment may be applied to the surface layer by using a cationic surface active agent or the like, in order to enhance the paper-feeding ability. The antistatic agent may be added to the surface layer, or may be dissolved and dispersed in a suitable solvent and applied after the surface layer is formed.

The solvent-coating method can be used to form the surface layer. To describe more specifically, the water-soluble resin, crosslinking agent, and monomer or oligomer and, if necessary, other additives are dissolved and/or dispersed in a suitable solvent such as water, a water/organic mixed solvent, or an organic solvent, and the resulting solution is applied onto the intermediate layer to form a layer thereon to have a thickness of 0.5 μm to 30 μm, preferably 3 μm to 20 μm, and more preferably 5 μm to 20 μm when measured after heating and drying.

After coating, at least the intermediate layer and the surface layer are heated at 50° C. to 180° C., preferably at 80° C. to 150° C. If the insolubilizing component is to be formed by photoirradiation within the surface layer, the heating is performed after or simultaneously with the photoirradiation. It is believed that the functional groups contained in the reactive compound added to the intermediate layer are bonded to the functional groups contained in the resin forming the surface layer through the heating, and thus the surface layer is firmly adhered or bonded to the intermediate layer.

The above obtained image-recording medium can be used repeatedly in a recycling system in which printed image-removing method involves the processes of a surface layer-swelling process, a physical friction process, such as brushing, and a drying process. In the case where the image-recording medium is subjected to such a process, if the strength of the surface layer is not sufficient when swollen, the surface layer tends to peel off because of the frictional force applied by brushing or the like. However, in the present invention, the strength of the surface layer of the image-recording medium is improved by crosslinking the water-soluble resin in the surface layer and by adding a water-insoluble resin. Furthermore, as the surface layer and the base layer are firmly adhered through the intermediate layer, the image-recording medium has sufficient resistance to brushing. Even when the printed material is removed by the friction applied by brushing, etc., peeling-off of the surface layer does not occur.

The following describes a method for removing a printed material from an image-recording medium whose surface is printed with a printed material such as toner. This method comprises the step of feeding the image-recording medium printed with a printed material to a solvent capable of swelling the surface layer, and the step of scraping the printed material from the swollen surface of the image-recording medium by a physical force. The method will be further described in detail with reference to figures.

Figure 2:
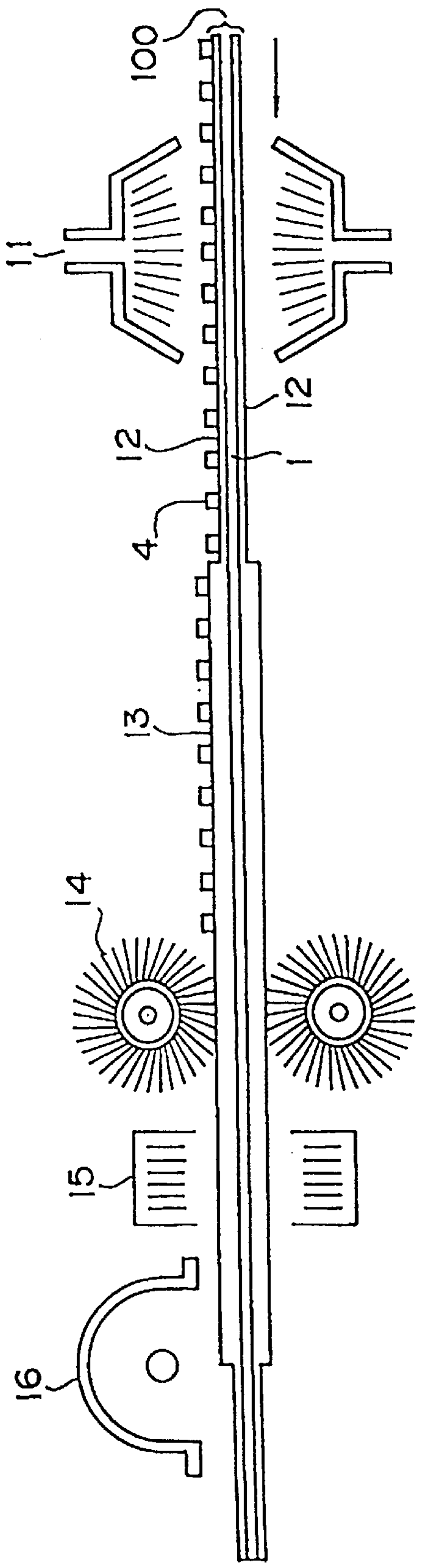
FIG. 2 is a process sequence diagram for explaining a printed material removing method.

FIG. 2 is a process sequence diagram for explaining one example of the printed material-removing method. In FIG. 2, an intermediate layer and a surface layer are formed on both sides of the image-recording medium 100. The intermediate layer and the surface layer are designated in toto by reference number 12. The surface of the image-recording medium is printed with a material for printing 4 such as toner. Toner used in electrophotography is preferably used as the material for printing. Other types of materials for printing can also be used, including such materials for printing as used in an ink jet method in which hot-melt ink is used, a thermal transfer method, or other printing processes. Other types of materials for printing, such as oil paint, that adheres to the surface of an image-recording medium to form a veliform image. The image-recording medium is transported from right to left in the figure.

First, the image-recording medium printed with the printed material 4 is supplied on its surface layer with a surface layer-swelling solvent from a solvent supplier 11. Various solvents, including an aqueous solvent such as water or a mixed solvent of water and a water-soluble organic solvent, or an aqueous organic solvent, can be used as the solvent capable of swelling the surface layer. An additive such as a surface active agent may be added to the solvent. In this way, the present invention has a great advantage in that the printed material can be removed with water. The following description deals with the case in which water is used.

Water may be supplied by spraying a shower of water over the surface layer from a shower device 11, as shown in FIG. 2. The surface layer may be immersed in water (not illustrated in the figure). It is preferable to expose the surface layer to water for about 15 to 150 seconds to allow water to soak into the surface layer of the image-recording medium. As the contact time increases, the water can be made to soak sufficiently, but the processing time increases correspondingly. When the water soak into the surface layer of the image-recording medium, the surface layer swells (the swollen surface layer is shown by reference number 13) and the adhesion between a printed material 4 and the surface layer decreases. At this time, the water temperature is kept at 15° C. to 45° C. If the temperature is too high, the amount of water evaporation increases If the temperature is too low, a sufficient cleaning effect may not be obtained.

After the water has sufficiently soaked through the surface layer, the image-recording medium is transported to a printed material-removing region where a brush 14 is applied. The brush 14 is rotating so that the printed material 4 on the image-recording medium 100 is removed by the brush. In the present invention, a removing means other than the brush may be used, for example, a means such as a blade or a cloth that rubs or scrapes the surface by applying a physical or mechanical force to the surface. In FIG. 2, the brush 14 is disposed away from the liquid, but may be placed in the liquid. A length of the brush 14 may be about 5 mm to 20 mm and the thickness about 10 $\mu$m to 60 $\mu$m. The material is not specifically limited, but nylon or the like is suitable.

The paper feed speed, i.e., the speed at which the image-recording medium passes under the brush 14, is determined by considering the balance between the processing time and the cleaning performance; for example, the speed is set within the range of 0.5 cm/second to 5 cm/second. Preferably, the rotational speed of the brush is set at five or more times the transport speed, and more preferably at 10 or more times.

After the printed material 4 has been removed, the image-recording medium is transported to a shower region where a cleaning shower 15 is supplied to the surface of the image-recording medium to wash out any remaining printed material on the surface of the image-recording medium. An aqueous solvent similar to the one used to swell the image-recording medium may be used as the liquid for the shower 15. It is particularly preferable to use water.

After subjected to the shower 15, the image-recording medium is transported to a drying region where it is dried by a dryer 16. The drying method may be accomplished either by a contact type such as a heat roller or by a noncontact type such as a far infrared lamp. A heating temperature is suitably in the range of 70 to 150° C.

Figure 3:
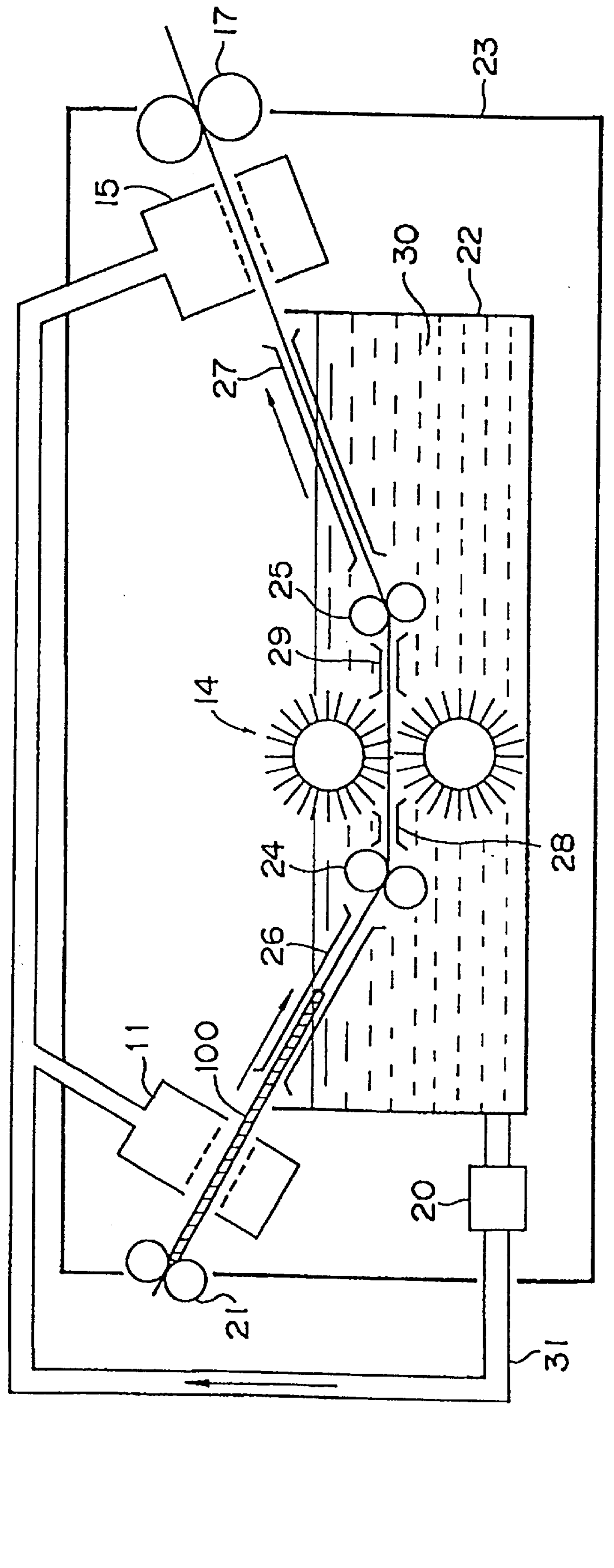
FIG. 3 is a schematic view showing one example of a cleaning apparatus.

FIG. 3 is a diagram showing one embodiment of a cleaning apparatus to which the above described cleaning method can be applied. The apparatus of FIG. 3 includes a cleaning tank 22, mounted inside a casing 23, for accommodating a liquid 30 for swelling the image-recording medium. To the cleaning tank 22 is connected a pump 20 equipped with a filter for removing the printed material in the liquid in the tank, and the pump 20 is further connected via a pipe 31 to a swelling shower 11 and a rinsing shower 15.

The liquid in the cleaning tank 22, after being purified by the filter in the pump 20, is fed through the pipe 31 to the showers 11 and 15, and is used as a liquid for swelling the image-recording medium in the shower 11 and as a liquid for rinsing in the shower 15.

The image-recording medium is fed into the apparatus by means of a paper feeding roller 21 and sprayed with the liquid for swelling from the shower 11. Then, the image-recording medium is transported via a guide 26 and a transport roller 24 and immersed in the liquid 30 in the cleaning tank 22. After immersed for a prescribed period of time, the image-recording medium is fed by means of the transport roller 24 and a guide 28 to a position facing to the brush 14, where the printed material is removed.

The image-recording medium is, then, transported via a guide 29, a transport roller 25, and a guide 27, is sprayed with the rinsing liquid from the shower 15, and is finally dried by a drying roller 17 and discharged to the outside of the apparatus.

Figure 4:
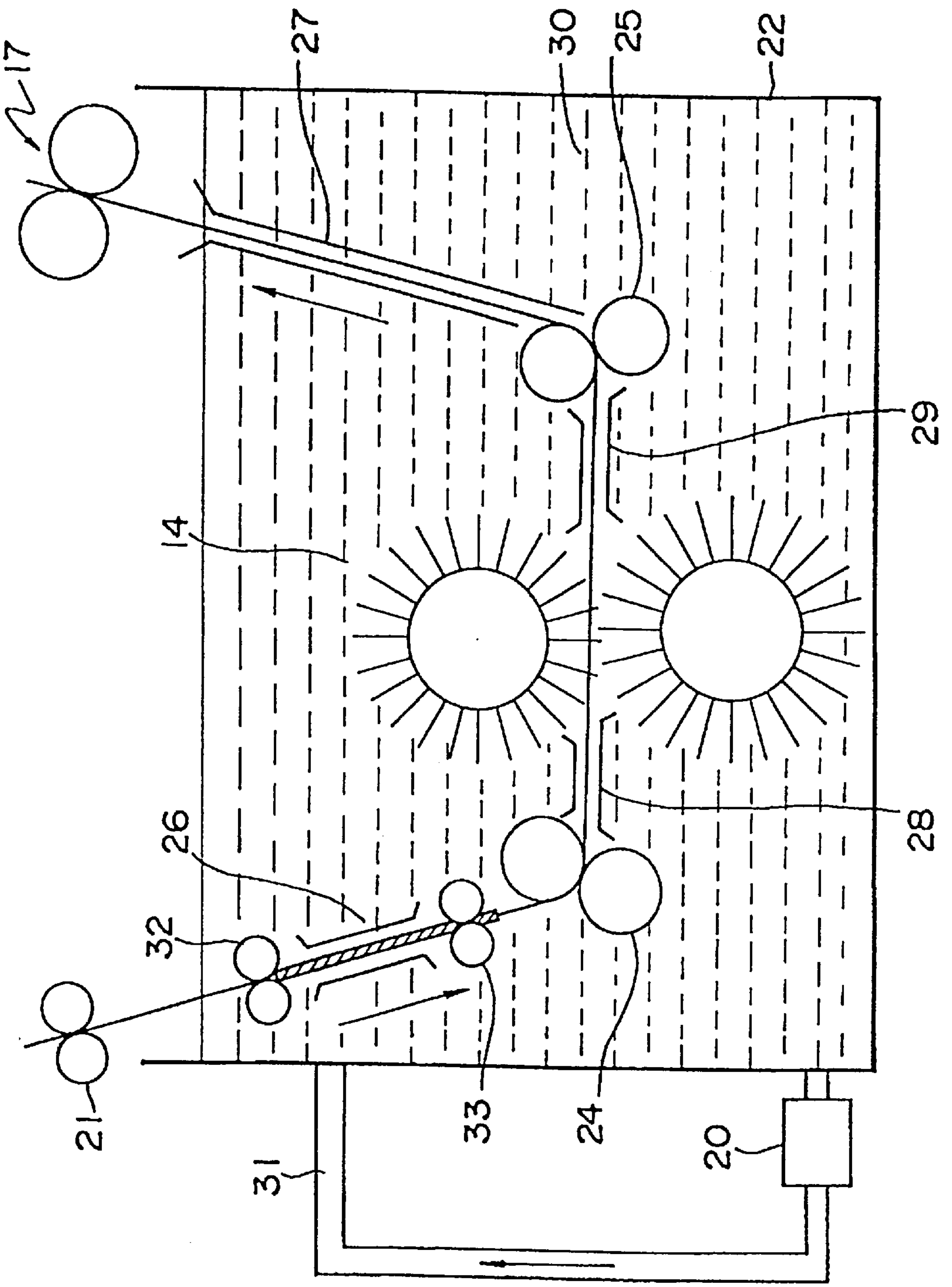
FIG. 4 is a schematic view showing one example of a cleaning apparatus.

FIG. 4 is a diagram showing another embodiment of the cleaning apparatus. In the apparatus of FIG. 4, the image-recording medium fed by means of a paper feed roller 21 is transported directly into a cleaning tank 22 by means of transport rollers 32, 33 and a guide 26, and immersed in a liquid 30 to allow water to soak into the surface layer of the image-recording medium before brushing. After passing the position facing to a brush 14, the image-recording medium is passed through the liquid 30 for a prescribed period of time before being fed to a drying roller 17, thereby obtaining the rinsing effect. The same components as those in FIG. 3 are designated by the same reference numbers, and detailed explanations of such components are omitted.

Figure 5:
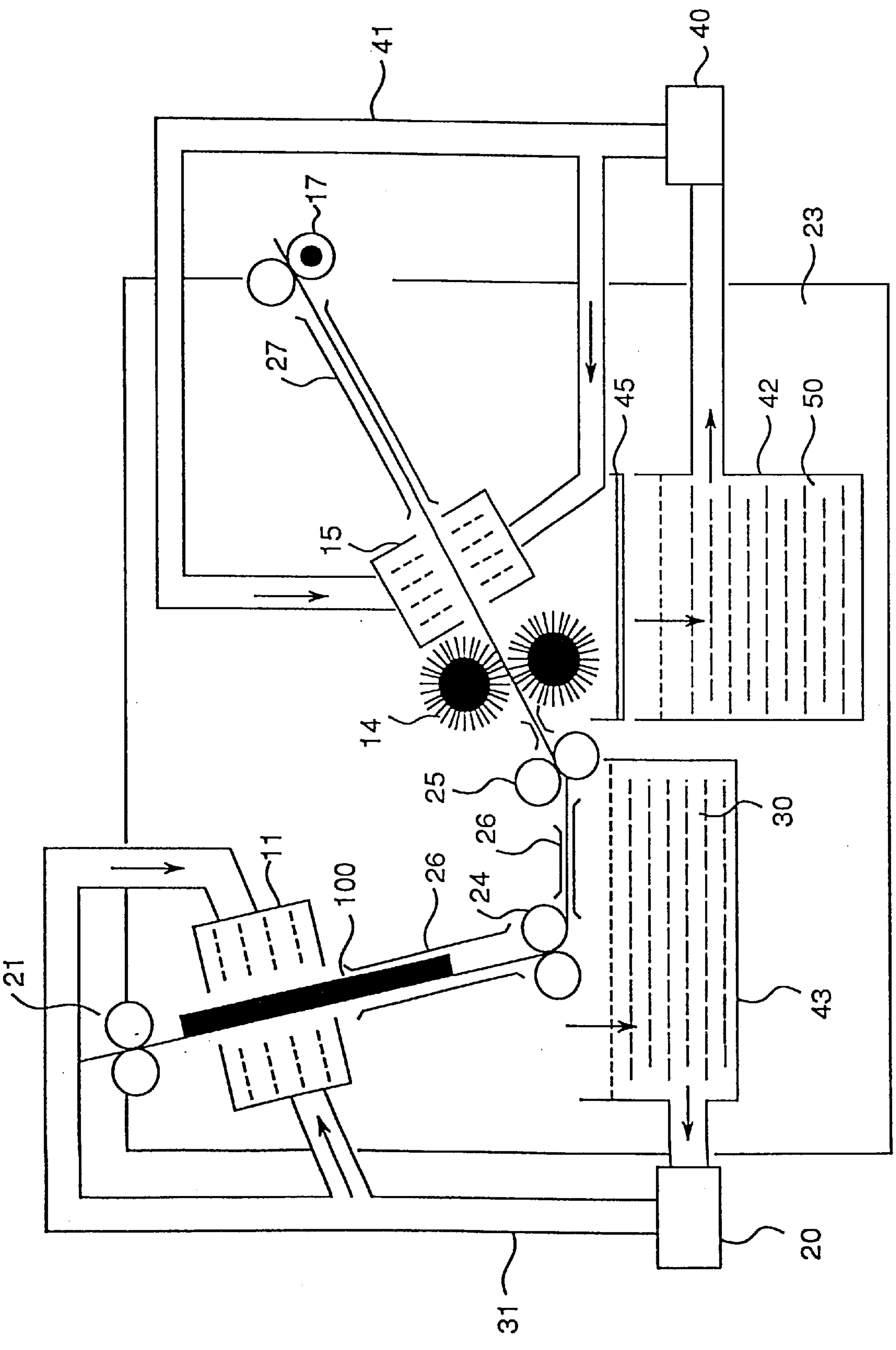
FIG. 5 is a schematic view showing one example of a cleaning apparatus.

FIG. 5 is a diagram showing yet another embodiment of the cleaning apparatus. In this apparatus, a swelling liquid tank 43, for accommodating a liquid 30 for swelling the image-recording medium, and a rinsing liquid tank 42, for accommodating a liquid for cleaning the image-recording medium after its surface has been rubbed by a brush 14, are provided independently of each other. The liquid 30 accommodated in the swelling liquid tank 43 is pumped up by a pump 20 equipped with a filter, and fed through a pipe 31 to the shower 11 where the liquid is sprayed for a prescribed period of time or in a prescribed quantity over the image-recording medium 100 being fed by a paper feed roller 21. The image-recording medium is transported to a brushing region 14 via a guide 26 and transport rollers 24 and 25. The swelling liquid sprayed on the image-recording medium from the shower 11 drops downward and is returned to the swelling liquid tank 43, located downward of the shower 11, and the liquid is thus circulated for reuse.

The image-recording medium 100 from which the printed material has been removed by the brush 14 is transported to a shower 15 where the cleaning shower 15 is supplied to the surface of the image-recording medium. A rinsing liquid 50 accommodated in the rinsing liquid tank 42 is pumped up by a pump 40 equipped with a filter, and supplied as the cleaning shower to the shower region through a pipe 41. The printed material scraped off by the brush and the printed material washed off by the rinsing liquid fall onto a filter 45 provided above the rinsing liquid tank, while the cleaning shower liquid falling from the shower region also drops onto the filter; the printed material is filtered out, and the rinsing liquid is returned to the tank 42 and circulated for reuse.

The image-recording medium passed through the shower region is transported via a guide 27 and is finally dried by a drying roller 17 with a built-in heater and discharged to the outside of the apparatus.

EXAMPLE 1

Base layer: A polyethylene terephthalate (PET) sheet with a thickness of 100 $\mu$m was used as a base layer.

Intermediate adhesive layer: A resin solution was prepared by dissolving 14 parts by weight of a polymethyl methacrylate resin in 86 parts by weight of tetrahydrofuran (THF). Four parts by weight of a 30% ethyl acetate solution (Desmodur RFE: made by Sumitomo Bayer K.K.) of isocyanate (solid at normal temperatures) having the following chemical formula was added to the resin solution and stirred. The resulting solution was applied onto the base layer by a bar coater, and heated at 80° C. for five minutes, followed by a corona discharge treatment, to form an intermediate adhesive layer of 3 $\mu$m thickness.

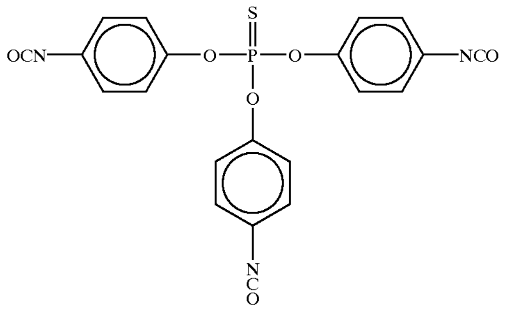

Surface layer: A resin solution was prepared by dissolving 12 parts by weight of polyvinyl alcohol PVA-117 (made by Kuraray K.K., degree of saponification: 100%) in 188 parts by weigh of water. Four parts by weight of polyethylene glycol diacrylate, one part by weight of sodium dialkylsulfosuccinate (PELEX NBR: made by Kao K.K.), and one part by weight of potassium persulfate as a polymerization initiator were added to the resin solution and stirred for five minutes. The resulting solution was applied onto the intermediate adhesive layer by a bar coater, and heated at 120° C. for two hours to form a surface layer of 7 $\mu$m thickness.

EXAMPLE 2

Base layer: A polyethylene naphthalate (PEN) sheet with a thickness of 80 $\mu$m was used as a base layer.

Intermediate adhesive layer: A resin solution was prepared by dissolving 16 parts by weight of a polycarbonate resin in 184 parts by weight of 1,4-dioxane. Two parts by weight of isocyanate having the following chemical formula (MILLIONATE MT: made by Nippon Polyurethane K.K., solid at normal temperatures) was added to the resin solution and stirred. The resulting solution was applied onto the base layer by a bar coater, and heated at 80° C. for five minutes, followed by a corona discharge treatment, to form an intermediate adhesive layer of 3 $\mu$m thickness.

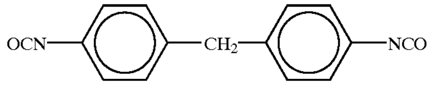

Surface layer: A resin solution was prepared by dissolving 12 parts by weight of polyvinyl alcohol PVA-220 (made by Kuraray K.K., degree of saponification: 88%) in 188 parts by weigh of water. Four parts by weight of aliphatic polyisocyanate (SBU0772: made by Sumitomo Bayer K.K.) and one part by weight of alkyl aryl sodium sulfosuccinate (ELEMINOR JS-2: made by Sanyo Kasei K.K.) were added to the resin solution and stirred for five minutes. The resulting solution was applied onto the intermediate adhesive layer by a bar coater, and heated at 140° C. for 15 minutes to form a surface layer of 5 $\mu$m thickness.

EXAMPLE 3

Base layer: A white PET sheet with a thickness of 100 $\mu$m (LUMILAR 100, E20; made by Toray K.K.) was used as a base layer.

Intermediate adhesive layer: A resin solution was prepared by dissolving 12 parts by weight of a vinyl chloride resin in 88 parts by weight of THF. Four parts by weight of an ethyl acetate solution of isocyanate (Desmodur RFE: made by Sumitomo Bayer K.K.) was added to the resin solution and stirred. The resulting solution was applied onto the base layer by a bar coater, and heated at 120° C. for 30 minutes to form an intermediate adhesive layer of 3 μm thickness.

Surface layer: A resin solution was prepared by dissolving 12 parts by weight of polyvinyl alcohol CM-318 (made by Kuraray K.K., degree of saponification: 88%) in 188 parts by weigh of water. Six parts by weight of aliphatic polyisocyanate (SBU0772: made by Sumitomo Bayer K.K.), one part by weight of sodium dodecylbenzenesulfonate, and 0.4 parts by weight of polyoxyethylene coconut oil fatty acid diethanolamide (PROFAN ME-20: made by Sanyo Kasei K.K.) were added to the resin solution and stirred for five minutes. The resulting solution was applied onto the intermediate adhesive layer by a bar coater, and heated at 140° C. for 2 hours to form a surface layer of 5 μm thickness.

EXAMPLE 4

Base layer: A PET sheet with a thickness of 100 μm was used as a base layer.

Intermediate adhesive layer: A resin solution was prepared by dissolving 14 parts by weight of a polycarbonate resin in 186 parts by weight of 1,4-dioxane. Two parts by weight of isocyanate (MILLIONATE MT: made by Nippon Polyurethane K.K.) was added to the resin solution and stirred. The resulting solution was applied onto the base layer by a bar coater, and heated at 100° C. for three minutes to form an intermediate adhesive layer of 2 μm thickness.

Surface layer: A resin solution was prepared by dissolving 12 parts by weight of polyvinyl alcohol PVA-117 (made by Kuraray K.K.) in 188 parts by weigh of water. Six parts by weight of urethane acrylate, 0.4 parts by weight of polyoxyethylene coconut oil fatty acid diethanolamide (PROFAN ME-20: made by Sanyo Kasei K.K.), and one part by weight of potassium persulfate as a polymerization initiator were added to the resin solution and stirred for five minutes. The resulting solution was applied onto the intermediate adhesive layer by a bar coater, and irradiated with 360 nm ultraviolet (UV) rays at 50 mW for 10 minutes. Then, heat was applied at 120 ° C. for 5 minutes to form a surface layer of 8 μm thickness.

EXAMPLE 5

Base layer: A PET sheet with a thickness of 150 μm was used as a base layer.

Intermediate adhesive layer: A resin solution was prepared by dissolving 14 parts by weight of a polycarbonate resin in 186 parts by weight of 1,4-dioxane. Two parts by weight of an ethyl acetate solution (CORONATE HL: made by Nippon Polyurethane K.K.) containing as solids (75%) the isocyanate (solid at normal temperatures) having the following chemical formula was added to the resin solution and stirred. The resulting solution was applied onto the base layer by a bar coater, and heated at 80° C. for three minutes to form an intermediate adhesive layer of 3 μm thickness.

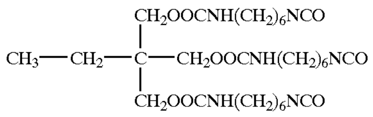

Surface layer: A resin solution was prepared by dissolving 14 parts by weight of polyvinyl alcohol PVA-117 (made by Kuraray K.K., degree of saponification: 100%) in 186 parts by weigh of water. Four parts by weight of polyethylene glycol diglycidyl ether (EPOLIGHT 400E: made by Kyoeisha Kagaku K.K.), one part by weight of potassium hydroxide, and 0.4 parts by weight of polyethylene glycol nonyl phenyl ether (NONYPOLE 60: made by Sanyo Kasei K.K.) were added to the resin solution and stirred for five minutes. The resulting solution was applied onto the intermediate adhesive layer by a bar coater, and heated at 120° C. for two hours to form a surface layer of 5 μm thickness.

EXAMPLE 6

Base layer: A PET sheet with a thickness of 150 μm was used as a base layer.

Intermediate adhesive layer: A resin solution was prepared by dissolving 14 parts by weight of a polycarbonate resin in 86 parts by weight of 1,4-dioxane. Four parts by weight of an ethyl acetate solution (Desmodur RFE: made by Sumitomo Bayer K.K.) of isocyanate was added to the resin solution and stirred. The resulting solution was applied onto the base layer by a bar coater, and heated at 80° C. for three minutes to form an intermediate adhesive layer of 2 μm thickness.

Surface layer: A resin solution was prepared by dissolving 12 parts by weight of methyl cellulose in 188 parts by weigh of water. Four parts by weight of glycerol diglycidyl ether (EPOLIGHT 80MF: made by Kyoeisha Kagaku K.K.), one part by weight of potassium hydroxide, and 0.4 parts by weight of polyethylene glycol nonyl phenyl ether (NONYPOLE 60: made by Sanyo Kasei K.K.) were added to the resin solution and stirred for five minutes. The resulting solution was applied onto the intermediate adhesive layer by a bar coater, and heated at 120° C. for two hours to form a surface layer of 3 μm thickness.

EXAMPLE 7

Base layer: A PEN sheet with a thickness of 100 μm was used as a base layer.

Intermediate adhesive layer: A resin solution was prepared by dissolving 12 parts by weight of a polyester resin in 188 parts by weight of 1,4-dioxane and adding one part by weight of 4,4'-methylene-bis (cyclohexyl isocyanate) (solid at normal temperatures) The resulting solution was applied onto the base layer by a bar coater, and heated at 120° C. for three minutes to form an intermediate adhesive layer of 1 μm thickness.

Surface layer: A resin solution was prepared by dissolving 14 parts by weight of polyacrylic acid in 186 parts by weigh of water. Six parts by weight of aliphatic polyisocyanate (SBU0772: made by Sumitomo Bayer K.K.) and one part by weight of sodium dodecylbenzenesulfonate were added to the resin solution and stirred for five minutes. The resulting solution was applied onto the intermediate adhesive layer by a bar coater, and heated at 120° C. for 60 minutes to form a surface layer of 5 μm thickness.

EXAMPLE 8

Base layer: A white PET sheet with a thickness of 10 μm (LUMILAR 100, E20: made by Toray K.K.) was used as a base layer.

Intermediate adhesive layer: A resin solution was prepared by dissolving 14 parts by weight of a polymethyl methacrylate resin in 86 parts by weight of THF. Four parts by weight of an ethyl acetate solution of isocyanate (Desmodur RFE: made by Sumitomo Bayer K.K.) was added to the resin solution and stirred. The resulting solution was applied onto the base layer by a bar coater, and heated at 80° C. for five minutes to form an intermediate adhesive layer of 3 μm thickness.

Surface layer: A resin solution was prepared by dissolving 12 parts by weight of polyvinyl alcohol PVA-117 (made by Kuraray K.K.) in 188 parts by weigh of water. Four parts by weight of polyethylene glycol diacrylate, one part by weight of sodium dialkylsulfosuccinate (PELEX NBR: made by Kao K.K.), 0.4 parts by weight of polyethylene glycol nonyl phenyl ether (NONYPOLE 60: made by Sanyo Kasei K.K.), and one part by weight of potassium persulfate as a polymerization initiator were added to the resin solution and stirred for five minutes. The resulting solution was applied onto the intermediate adhesive layer by a bar coater, and heated at 120° C. for two hours in a nitrogen atmosphere to form a surface layer of 12 μm thickness.

EXAMPLE 9

Base layer: A white PET sheet with a thickness of 100 μm (LUMILAR 100, E20: made by Toray K.K.) was used as a base layer.

Intermediate adhesive layer: A resin solution was prepared by dissolving 14 parts by weight of a polymethyl methacrylate resin in 86 parts by weight of THF. Four parts by weight of an ethyl acetate solution with isocyanate dissolved therein (Desmodur RFE: made by Sumitomo Bayer K.K.) was added to the resin solution. The resulting solution was stirred, applied onto the base layer by a bar coater, and heated at 80° C. for five minutes to form an intermediate adhesive layer of 5 μm thickness.

Surface layer: A resin solution was prepared by dissolving 12 parts by weight of polyvinyl alcohol PVA-117 (made by Kuraray K.K.) in 188 parts by weigh of water. Four parts by weight of polyethylene glycol diacrylate, one part by weight of sodium dialkylsulfosuccinate (PELEX NBR: made by Kao K.K.), 0.4 parts by weight of polyethylene glycol nonyl phenyl ether (NONYPOLE 60: made by Sanyo Kasei K.K.), and one part by weight of potassium persulfate as a polymerization initiator were added to the resin solution and stirred for five minutes, and two parts by weight of alumina fine particles (A-31: average particle size 5 μm: made by Nippon KeiKinzoku K.K.) were added. The resulting solution was applied onto the intermediate adhesive layer by a bar coater, and heated at 120° C. for two hours in a nitrogen atmosphere to form a surface layer of 12 μm thickness. The secondary particle size of the alumina fine particles was measured by means of an optical microscope to be about 15 μm.

EXAMPLE 10

Base layer: A PEN sheet with a thickness of 100 μm was used as a base layer.

Intermediate adhesive layer: A resin solution was prepared by dissolving 12 parts by weight of a vinyl chloride resin in 188 parts by weight of THF and adding one part by weight of xylene di-isocyanate (melting point: 10° C., viscous liquid at normal temperatures). The resulting solution was applied onto the base layer by a bar coater, and heated at 80° C. for three minutes to form an intermediate adhesive layer of 3 μm thickness.

Surface layer: A resin solution was prepared by dissolving 14 parts by weight of polyacrylic acid in 186 parts by weigh of water. Six parts by weight of aliphatic polyisocyanate (SBU0772: made by Sumitomo Bayer K.K.), one part by weight of alkyl aryl sodium sulfosuccinate (ELEMINOR JS-2: made by Sanyo Kasei K.K.), and 0.4 parts by weight of polyoxyethylene coconut oil fatty acid diethanolamide (PROFAN ME-20: made by Sanyo Kasei K.K.) were added to the resin solution and stirred for five minutes. The resulting solution was applied onto the intermediate adhesive layer by a bar coater, and heated at 120° C. for 60 minutes to form a surface layer of 5 μm thickness.

EXAMPLE 11

Base layer: A PET sheet with a thickness of 100 μm was used as a base layer.

Intermediate adhesive layer: A resin solution was prepared by dissolving 14 parts by weight of a polycarbonate resin in 186 parts by weight of 1,4-dioxane. One part by weight of a melamine-formaldehyde resin (SUMIREZ 613: made by Sumitomo Kagaku K.K.) was added to the resin solution and stirred. The resulting solution was applied onto the base layer by a bar coater, and heated at 80° C. for five minutes, followed by a corona discharge treatment, to form an intermediate adhesive layer of 3 μm thickness.

Surface layer: A resin solution was prepared by dissolving 12 parts by weight of polyvinyl alcohol CM-318 (made by Kuraray K.K.) in 188 parts by weigh of water. Amelamine-formaldehyde resin (SUMIREZ 613: made by Sumitomo Kagaku K.K.) (0.5 parts by weight), 0.6 parts by weight of ammonium chloride, and 0.1 part by weight of polyoxyethylene coconut oil fatty acid ethanolamide (PROFAN ME-20: made by Sanyo Kasei K.K.) were added to the resin solution and stirred for five minutes. The resulting solution was applied onto the intermediate adhesive layer by a bar coater, and heated at 120° C. for 2 hours to form a surface layer of 9 μm thickness.

EXAMPLE 12

Base layer: A PEN sheet with a thickness of 80 μm was used as a base layer.

Intermediate adhesive layer: A resin solution was prepared by dissolving 16 parts by weight of a vinyl chloride resin in 184 parts by weight of THF. Two parts by weight of polyethylene glycol diglycidyl ether (EPOLIGHT 400E: made by Kyoeisha Kagaku K.K.) was added to the resin solution and stirred. The resulting solution was applied onto the base layer by a bar coater, and heated at 80° C. for five minutes to form an intermediate adhesive layer of 3 μm thickness.

Surface layer: A resin solution was prepared by dissolving 12 parts by weight of polyvinyl alcohol PVA-220 (made by Kuraray K.K.) in 188 parts by weigh of water. Four parts by weight of aliphatic polyisocyanate (SBU0772: made by Sumitomo Bayer K.K.), 0.4 parts by weight of polyoxyethylene coconut oil fatty acid ethanolamide (PROFAN ME-20: made by Sanyo Kasei K.K.), and one part by weight of sodium polyoxyethylene lauryl ether sulfate (SUNDET EN: made by Sanyo Kasei K.K.) were added to the resin solution and stirred for five minutes. The resulting solution was applied onto the intermediate adhesive layer by a bar coater, and heated at 140° C. for 15 minutes to form a surface layer of 12 μm thickness.

EXAMPLE 13

Base layer: A white PET sheet with a thickness of 100 μm (LUMILAR 100, E20: made by Toray K.K.) was used as a base layer.

Intermediate adhesive layer: A resin solution was prepared by dissolving 12 parts by weight of a vinyl chloride resin in 88 parts by weight of THF. Four parts by weight of an ethyl acetate solution of isocyanate (Desmodur RFE: made by Sumitomo Bayer K.K.) was added to the resin solution and stirred. The resulting solution was applied onto the base layer by a bar coater, and heated at 120° C. for 30 minutes to form an intermediate adhesive layer of 3 μm thickness.

Surface layer: A resin solution was prepared by dissolving 12 parts by weight of polyvinyl alcohol CM-318 (made by Kuraray K.K.) in 188 parts by weigh of water. Six parts by weight of aliphatic polyisocyanate (SBU0772: made by Sumitomo Bayer K.K.) and one part by weight of sodium dialkylsulfosuccinate (PELEXNBR: made by Kao K.K.) were added to the resin solution and stirred for five minutes. The resulting solution was applied onto the intermediate adhesive layer by a bar coater, and heated at 140° C. for two hours to form a surface layer of 10 μm thickness.

EXAMPLE 14

Base layer: A PET sheet with a thickness of 100 μm was used as a base layer.

Intermediate adhesive layer: A resin solution was prepared by dissolving 14 parts by weight of a polycarbonate resin in 186 parts by weight of 1,4-dioxane. Two parts by weight of isocyanate (MILLIONATE MT: made by Nippon Polyurethane K.K.) was added to the resin solution and stirred. The resulting solution was applied onto the base layer by a bar coater, and heated at 100° C. for three minutes to form an intermediate adhesive layer of 2 μm thickness.

Surface layer: A resin solution was prepared by dissolving 12 parts by weight of polyvinyl alcohol CM-318 (made by Kuraray K.K.) in 188 parts by weigh of water. Two parts by weight of a 25% water solution of glutaraldehyde, 0.6 parts by weight of polyethylene glycol dodecyl phenyl ether (DODECAPOLE 120: made by Sanyo Kasei K.K.), and 0.4 parts by weight of ammonium chloride were added to the resin solution and stirred for five minutes. The resulting solution was applied onto the intermediate adhesive layer by a bar coater, and heated at 120° C. for 45 minutes to form a surface layer of 8 μm thickness.

EXAMPLE 15

Base layer: A polycarbonate sheet with a thickness of 120 μm was used as a base layer.

Intermediate adhesive layer: A resin solution was prepared by dissolving 14 parts by weight of a polycarbonate resin in 186 parts by weight of 1,4-dioxane. Two parts by weight of a melamine-formaldehyde resin (SUMIREZ 613: made by Sumitomo Kagaku K.K.) was added to the resin solution and stirred. The resulting solution was applied onto the base layer by a bar coater, and heated at 80° C. for three minutes to form an intermediate adhesive layer of 3 μm thickness.

Surface layer: A resin solution was prepared by dissolving 12 parts by weight of methyl cellulose in 188 parts by weigh of water. A melamine-formaldehyde resin (0.3 parts by weight), 0.6 parts by weight of ammonium chloride, and 0.4 parts by weight of polyethylene glycol nonyl phenyl ether (NONYPOLE 60: made by Sanyo Kasei K.K.) were added to the resin solution and stirred for 15 minutes. The resulting solution was applied onto the intermediate adhesive layer by a bar coater, and heated at 120° C. for two hours to form a surface layer of 15 μm thickness.

EXAMPLE 16

Base layer: A PET sheet with a thickness of 150 μm was used as a base layer.

Intermediate adhesive layer: Ten parts by weight of a melamine-formaldehyde resin (SUMIREZ 613: made by Sumitomo Kagaku K.K.) was added to 200 parts by weight of an urethane-resin-water-dispersion (HUX-232: solid content of about 30 weight percent: made by Asahi Denka Kogyo K.K.) and stirred. The resulting solution was applied onto the base layer by a bar coater, and heated at 100° C. for five minutes to form an intermediate adhesive layer of 1 μm thickness.

Surface layer: A resin solution was prepared by dissolving 12 parts by weight of polyvinyl alcohol CM-318 (made by Kuraray K.K.) in 188 parts by weigh of water. Amelamine-formaldehyde resin (SUMIREZ 613: made by Sumitomo Kagaku K.K.) (0.5 parts by weight), 0.6 parts by weight of ammonium chloride, one part by weight of silica fine particles (particle size 1 μm, SYLYSIA350: made by Fuji Sylysia K.K.), and 0.1 part by weight of polyoxyethylene coconut oil fatty acid ethanolamide (PROFAN ME-20: made by Sanyo Kasei K.K.) were added to the resin solution and stirred for five minutes. The resulting solution was applied onto the intermediate adhesive layer by a bar coater, and heated at 140° C. for 30 minutes to form a surface layer of 6 μm thickness. The secondary particle size of the silica fine particles was measured by means of an optical microscope to be about 20 μm.

EXAMPLE 17

Base layer: A PEN sheet with a thickness of 100 μm was used as a base layer.

Intermediate adhesive layer: A resin solution was prepared by dissolving 14 parts by weight of a polycarbonate resin in 186 parts by weight of 1,4-dioxane. Six parts by weight of a 25% water solution of glutaraldehyde was added to the resin solution and stirred. The resulting solution was applied onto the base layer by a bar coater, and heated at 80° C. for three minutes to form an intermediate adhesive layer of 3 μm thickness.

Surface layer: A resin solution was prepared by dissolving 12 parts by weight of polyvinyl alcohol CM-318 (made by Kuraray K.K.) in 188 parts by weigh of water. Amelamine-formaldehyde resin (SUMIREZ 613: made by Sumitomo Kagaku K.K.) (0.5 parts by weight), one part by weight of polyoxyethylene coconut oil fatty acid ethanolamide (PROFAN ME-20: made by Sanyo Kasei K.K.), and 0.6 parts by weight of ammonium chloride were added to the resin solution and stirred for five minutes. The resulting solution was applied onto the intermediate adhesive layer by a bar coater, and heated at 120° C. for 30 minutes to form a surface layer of 8 μm thickness.

EXAMPLE 18

Base layer: A white PET sheet with a thickness of 100 μm (LUMILAR 100, E20: made by Toray K.K.) was used as a base layer.

Intermediate adhesive layer: A resin solution was prepared by dissolving 14 parts by weight of a polymethyl methacrylate resin in 186 parts by weight of THF. Two parts by weight of polyethylene glycol diglycidyl ether (EPOLIGHT 400E: made by Kyoeisha Kagaku K.K.) was added to the resin solution and stirred. The resulting solution was applied onto the base layer by a bar coater, and heated at 80° C. for five minutes to form an intermediate adhesive layer of 3 μm thickness.

Surface layer: A resin solution was prepared by dissolving 14 parts by weight of polyacrylic acid in 186 parts by weigh of water. Polyethylene glycol nonyl phenyl ether (NONYPOLE 60: made by Sanyo Kasei K.K.) (0.4 parts by weight), one part by weight of alkyl aryl sodium sulfosuccinate (ELEMINOR JS-2: made by Sanyo Kasei K.K.), and 6 parts by weight of aliphatic polyisocyanate (SBU0772: made by Sumitomo Bayer K.K.) were added to the resin solution and stirred for five minutes. The resulting solution was applied onto the intermediate adhesive layer by a bar coater, and heated at 140° C. for 60 minutes to form a surface layer of 8 $\mu$m thickness.

EXAMPLE 19

Base layer: A white PET sheet with a thickness of 10 $\mu$m (LUMILAR 100, E20: made by Toray K.K.) was used as a base layer.

Intermediate adhesive layer: A resin solution was prepared by dissolving 14 parts by weight of a polymethyl methacrylate resin in 86 parts by weight of THF. Four parts by weight of an ethyl acetate solution of isocyanate (Desmodur RFE: made by Sumitomo Bayer K.K.) was added to the resin solution and stirred. The resulting solution was applied onto the base layer by a bar coater, and heated at 80° C. for five minutes to form an intermediate adhesive layer of 3 $\mu$m thickness.

Surface layer: A resin solution was prepared by dissolving 12 parts by weight of polyvinyl alcohol PVA-117 (made by Kuraray K.K.) in 188 parts by weigh of water. Four parts by weight of polyethylene glycol diacrylate, 0.4 parts by weight of polyoxyethylene coconut oil fatty acid ethanolamide (PROFAN ME-20: made by Sanyo Kasei K.K.), and one part by weight of potassium persulfate as a polymerization initiator were added to there sinsolution and stirred for five minutes. The resulting solution was applied onto the intermediate adhesive layer by a bar coater, and heated at 120° C. for two hours in a nitrogen atmosphere to form a surface layer of 12 $\mu$m thickness.

EXAMPLE 20

Base layer: A white PET sheet with a thickness of 100 $\mu$m (LUMILAR 100, E20: made by Toray K.K.) was used as a base layer.

Intermediate adhesive layer: A resin solution was prepared by dissolving 14 parts by weight of a polymethyl methacrylate resin in 186 parts by weight of THF. Four parts by weight of a melamine-formaldehyde resin (SUMIREZ 613: made by Sumitomo Kagaku K.K.) was added to the resin solution. The resulting solution, after stirring, was applied onto the base layer by a bar coater, and heated at 80° C. for five minutes to form an intermediate adhesive layer of 5 $\mu$m thickness.

Surface layer: A resin solution was prepared by dissolving 12 parts by weight of polyvinyl alcohol CM-318 (made by Kuraray K.K.) in 188 parts by weigh of water. Amelamine-formaldehyde resin (SUMIREZ 613: made by Sumitomo Kagaku K.K.) (0.5 parts by weight), 0.4 parts by weight of polyethylene glycol nonyl phenyl ether (NONYPOLE 60: made by Sanyo Kasei K.K.), 0.6 parts by weight of ammonium chloride, and two parts by weight of benzoguanamine-formalin resin fine particles (particle size 13 $\mu$m, EPOSTAR L15: made by Nippon Shokubai Kagagu Kogyo) were added to the resin solution and stirred for five minutes. The resulting solution was applied onto the intermediate adhesive layer by a bar coater, and heated at 160° C. for 15 minutes to form a surface layer of 12 $\mu$m thickness. The secondary particle size of the resin fine particles was measured by means of an optical microscope to be about 13 $\mu$m.

EXAMPLE 21

Base layer: A white PET sheet with a thickness of 100 $\mu$m (LUMILAR 100, E20: made by Toray K.K.) was used as a base layer.

Intermediate adhesive layer: Five parts by weight of a melamine-formaldehyde resin (SUMIREZ 613: made by Sumitomo Kagaku K.K.) and 0.1 part by weight of polyoxyethylene coconut oil fatty acid ethanolamide (PROFAN ME-20: made by Sanyo Kasei K.K.) were added to 100 parts by weight of an urethane-resin-water-dispersion (HUX-232: made by Asahi Denka Kogyo K.K.). The resulting solution, after stirring, was applied onto the base layer by a bar coater, and heated at 120° C. for one minute to form an intermediate adhesive layer of 5 $\mu$m thickness.

Surface layer: A resin solution was prepared by dissolving 12 parts by weight of polyvinyl alcohol CM-318 (made by Kuraray K.K.) in 188 parts by weigh of water. Amelamine-formaldehyde resin (SUMIREZ 613: made by Sumitomo Kagaku K.K.) (0.5 parts by weight), 0.6 parts by weight of ammonium chloride, 0.4 parts by weight of polyethylene glycol dodecyl phenyl ether (DODECAPOLE 90: made by Sanyo Kasei K.K.), and 0.6 parts by weight of silica fine particles (SYLYSIA 450: made by Fuji Sylysia K.K., average particle size: 5 $\mu$m) were added to the resin solution and stirred for five minutes. The resulting solution was applied onto the intermediate adhesive layer by a bar coater, and heated at 140° C. for 20 minutes to form a surface layer of 10 $\mu$m thickness. The secondary particle size of the silica fine particles was measured by means of an optical microscope to be about 10 $\mu$m.

EXAMPLE 22

Base layer: A PET sheet with a thickness of 100 $\mu$m was used as a base layer.

Intermediate adhesive layer: Five parts by weight of dimethylol urea, 0.2 parts by weight of polyethylene glycol nonyl phenyl ether (NONYPOLE 60: made by Sanyo Kasei K.K.), and 0.3 parts by weight of silica fine particles (SYLYSIA 450: made by Fuji Sylysia K.K.), the same particles as used in Example 21, were added to 100 parts by weight of an urethane-resin-water-dispersion (HUX-260: made by Asahi Denka Kogyo K.K.) and stirred. The resulting solution was applied onto the base layer by a bar coater, and heated at 80° C. for 15 minutes to form an intermediate adhesive layer of 4 $\mu$m thickness.

Surface layer: A resin solution was prepared by dissolving 16 parts by weight of polyvinyl alcohol CM-318 (made by Kuraray K.K.) in 184 parts by weigh of water. Amelamine-formaldehyde resin (SUMIREZ 613: made by Sumitomo Kagaku K.K.) (0.7 parts by weight), 0.6 parts by weight of ammonium chloride, and 0.4 parts by weight of polyethylene glycol dodecyl phenyl ether (DODECAPOLE 90: made by Sanyo Kasei K.K.) were added to the resin solution and stirred for five minutes. The resulting solution was applied onto the intermediate adhesive layer by a bar coater, and heated at 140° C. for 30 minutes to form a surface layer of 7 $\mu$m thickness.

EXAMPLE 23

Base layer: A PET sheet with a thickness of 80 $\mu$m was used as a base layer.

Intermediate adhesive layer: Five parts by weight of a melamine-formaldehyde resin (SUMIREZ 613: made by Sumitomo Kagaku K.K.) and 0.1 part by weight of polyethylene glycol nonyl phenyl ether (NONYPOLE 90: made by Sanyo Kasei K.K.) were added to 100 parts by weight of an urethane-resin-water-dispersion (HUX-232: made by Asahi Denka Kogyo K.K.) and stirred. The resulting solution was applied onto the base layer by a bar coater, and heated at 140° C. for one minute to form an intermediate adhesive layer of 2 μm thickness.

Surface layer: A resin solution was prepared by dissolving 12 parts by weight of polyvinyl alcohol KL-318 (made by Kuraray K.K.) in 188 parts by weigh of water. Polyethylene glycol diglycidyl ether (EX-832: made by Nagase Kasei K.K.) (0.6 parts by weight), 0.4 parts by weight of polyethylene glycol nonyl phenyl ether (NONYPOLE 90: made by Sanyo Kasei K.K.), and 0.2 parts by weight of potassium hydroxide were added to the resin solution and stirred for five minutes. The resulting solution was applied onto the intermediate adhesive layer by a bar coater, and heated at 140° C. for 30 minutes to form a surface layer of 7 μm thickness.

EXAMPLE 24

Base layer: A PET sheet with a thickness of 100 μm was used as a base layer.

Intermediate adhesive layer: A resin solution was prepared by dissolving 14 parts by weight of a polycarbonate resin in 186 parts by weight of 1,4-dioxane. Two parts by weight of a melamine-formaldehyde resin (SUMIREZ 613: made by Sumitomo Kagaku K.K.) was added to the resin solution and stirred. The resulting solution was applied onto the base layer by a bar coater, and heated at 120° C. for three minutes to form an intermediate adhesive layer of 3 μm thickness.

Surface layer: A resin solution was prepared by dissolving 12 parts by weight of polyvinyl alcohol CM-318 (made by Kuraray K.K.) in 188 parts by weigh of water. Dimethylol urea (0.4 parts by weight), 0.4 parts by weight of polyethylene glycol nonyl phenyl ether (NONYPOLE 120: made by Sanyo Kasei K.K.), 0.6 parts by weight of ammonium chloride, and two parts by weight of alumina fine particles (A-31: made by Nippon KeiKinzoku K.K.), the same particles as used in Example 9, were added to the resin solution and stirred for five minutes. The resulting solution was applied onto the intermediate adhesive layer by a bar coater, and heated at 120° C. for 120 minutes to form a surface layer of 8 μm thickness.

EXAMPLE 25

Base layer: A PET nonwoven fabric with a thickness of 126 μm (05TH-80OH: made by Hirose Seishi K.K.) was used as a base layer.

Intermediate adhesive layer: A resin solution was prepared by dissolving 14 parts by weight of a polycarbonate resin in 186 parts by weight of 1,4-dioxane. Two parts by weight of a melamine-formaldehyde resin (SUMIREZ 613: made by Sumitomo Kagaku K.K.) was added to the resin solution and stirred. The PET nonwoven fabric or a base layer was immersed in the resulting solution, and thereafter taken out of the solution and heated at 100° C. for 15 minutes to form an intermediate adhesive layer.

Surface layer: A resin solution was prepared by dissolving 12 parts by weight of polyvinyl alcohol CM-318 (made by Kuraray K.K.) in 188 parts by weigh of water. Amelamine-formaldehyde resin (SUMIREZ 613: made by Sumitomo Kagaku K.K.) (0.4 parts by weight), 0.4 parts by weight of polyethylene glycol nonyl phenyl ether (NONYPOLE 60: made by Sanyo Kasei K.K.), and 0.6 parts by weight of ammonium chloride were added to the resin solution and stirred for five minutes. The base layer with the intermediate adhesive layer formed thereon was immersed in the resulting solution, and thereafter taken out of the solution and heated at 120° C. for 120 minutes to form a surface layer.

EXAMPLE 26

Base layer: A synthetic paper of PET base (WEY-120T: made by Nisshinbo K.K.) was used as a base layer.

Intermediate adhesive layer: Two parts by weight of a melamine-formaldehyde resin (SUMIREZ 613: made by Sumitomo Kagaku K.K.) and 0.2 parts by weight of polyethylene glycol dodecyl phenyl ether (DODECAPOLE 120: made by Sanyo Kasei K.K.) were added to 100 parts by weight of an urethane-resin-water-dispersion (HUX-232: made by Asahi Denka Kogyo K.K.) and stirred. The resulting solution was applied onto the base layer by a bar coater, and heated at 80° C. for five minutes to form an intermediate adhesive layer of 10 μm thickness.

Surface layer: A resin solution was prepared by dissolving 12 parts by weight of polyvinyl alcohol CM-318 (made by Kuraray K.K.) in 188 parts by weigh of water. Amelamine-formaldehyde resin (SUMIREZ 613: made by Sumitomo Kagaku K.K.) (0.4 parts by weight), 0.4 parts by weight of polyethylene glycol nonyl phenyl ether (NONYPOLE 60: made by Sanyo Kasei K.K.), 0.6 parts by weight of ammonium chloride, and one part by weight of polymethyl methacrylate resin fine particles (EPOSTAR MA1013: made by Nippon Shokubai Kagaku Kogyo, average particle size 13 μm) were added to the resin solution and stirred for five minutes. The resulting solution was applied onto the intermediate adhesive layer by a bar coater, and heated at 160° C. for 15 minutes to form a surface layer of 9 μm thickness. The secondary particle size of the resin fine particles was measured by means of an optical microscope to be about 15 μm.

EXAMPLE 27

Base layer: Plain paper (EP paper for copying machine, made by Minolta K.K.) was used as a base layer.

Intermediate adhesive layer: A resin solution was prepared by dissolving 14 parts by weight of a polycarbonate resin in 186 parts by weight of 1,4-dioxane. Two parts by weight of a melamine-formaldehyde resin (SUMIREZ 613: made by Sumitomo Kagaku K.K.) and 0.2 parts by weight of polyethylene glycol dodecyl phenyl ether (DODECAPOLE 120: made by Sanyo Kasei K.K.) were added to the resin solution and stirred. The resulting solution was applied onto the base layer by a bar coater, and heated at 100° C. for 15 minutes to form an intermediate adhesive layer.

Surface layer: A resin solution was prepared by dissolving 12 parts by weight of polyvinyl alcohol CM-318 (made by Kuraray K.K.) in 188 parts by weigh of water. Amelamine-formaldehyde resin (SUMIREZ 613: made by Sumitomo Kagaku K.K.) (0.4 parts by weight), 0.4 parts by weight of polyethylene glycol dodecyl phenyl ether (DODECAPOLE 120: made by Sanyo Kasei K.K.), and 0.6 parts by weight of ammonium chloride were added to the resin solution and stirred for five minutes. The resulting solution was applied onto the intermediate adhesive layer by a bar coater, and heated at 120° C. for 120 minutes to form a surface layer.

EXAMPLE 28

Base layer: A white PET sheet with a thickness of 100 μm (LUMILAR?? 100, E20: made by Toray K.K.) was used as a base layer.

Intermediate adhesive layer: Five parts by weight of a melamine-formaldehyde resin (SUMIREZ 613: made by Sumitomo Kagaku K.K.) and 0.1 part by weight of polyethylene glycol nonyl phenyl ether (NONYPOLE 90: made by Sanyo Kasei K.K.) were added to 100 parts by weight of an urethane-resin-water-dispersion (HUX-232: made by Asahi Denka Kogyo K.K.) and stirred. The resulting solution was applied onto the base layer by a bar coater, and heated at 140° C. for one minute to form an intermediate adhesive layer of 2 $\mu$m thickness.

Surface layer: A resin solution was prepared by dissolving 12 parts by weight of polyvinyl alcohol CM-318 (made by Kuraray K.K.) in 188 parts by weigh of water. Amelamine-formaldehyde resin (SUMIREZ 613: made by Sumitomo Kagaku K.K.) (0.4 parts by weight), 0.1 part by weight of polyoxyethylene coconut oil fatty acid ethanolamide (PROFAN ME-20: made by Sanyo Kasei K.K.), 0.6 parts by weight of ammonium chloride, and 1.5 parts by weight of silica fine particles (SYLYSIA 350: made by Fuji Sylysia K.K.), the same particles as used in Example 16, were added to the resin solution and stirred for five minutes. The resulting solution was applied onto the intermediate adhesive layer by a bar coater, and heated at 140° C. for 30 minutes to form a surface layer of 10 $\mu$m thickness.

EXAMPLE 29

Base layer: A PET sheet with a thickness of 150 $\mu$m was used as a base layer.

Intermediate adhesive layer: A resin solution was prepared by dissolving 14 parts by weight of a polymethyl methacrylate resin in 186 parts by weight of THF. The resin solution was applied onto the base layer by a bar coater, and heated at 60° C. for five minutes to form an intermediate adhesive layer of 1 $\mu$m thickness.

Surface layer: A resin solution was prepared by dissolving 12 parts by weight of polyvinyl alcohol PVA-117 (made by Kuraray K.K.) in 188 parts by weigh of water. Four parts by weight of polyethylene glycol diacrylate, one part by weight of sodium dialkylsulfosuccinate (PELEX NBR: made by Kao K.K.), 0.4 parts by weight of polyethylene glycol nonyl phenyl ether (NONYPOLE 60: made by Sanyo Kasei K.K.), and one part by weight of potassium persulfate as a polymerization initiator were added to the resin solution and stirred for five minutes. The resulting solution was applied onto the intermediate adhesive layer by a bar coater, and heated at 120° C. for two hours in a nitrogen atmosphere to form a surface layer of 4 $\mu$m thickness.

EXAMPLE 30

Base layer: A PET sheet with a thickness of 80 $\mu$m was used as a base layer.

Intermediate adhesive layer: None

Surface layer: A resin solution was prepared by dissolving 12 parts by weight of polyvinyl alcohol PVA-117 (made by Kuraray K.K.) in 188 parts by weigh of water. Four parts by weight of polyethylene glycol diacrylate, 1.2 parts by weight of sodium dodecylbenzenesulfonate, and one part by weight of potassium persulfate as a polymerization initiator were added to the resin solution and stirred for five minutes. The resulting solution was applied onto the base layer by a bar coater, and heated at 120° C. for one hour in a nitrogen atmosphere to form a surface layer of 3 $\mu$m thickness.

EXAMPLE 31

Base layer: A PET sheet with a thickness of 150 $\mu$m was used as a base layer.

Intermediate adhesive layer: A resin solution was prepared by dissolving 14 parts by weight of a polycarbonate resin in 186 parts by weight of 1,4-dioxane. The resin solution was applied onto the base layer by a bar coater, and heated at 80° C. for five minutes to form an intermediate adhesive layer of 3 $\mu$m thickness.

Surface layer: A resin solution was prepared by dissolving 12 parts by weight of polyvinyl alcohol CM-318 (made by Kuraray K.K.) in 188 parts by weigh of water. Amelamine-formaldehyde resin (SUMIREZ 613: made by Sumitomo Kagaku K.K.) (0.5 parts by weight), 0.2 parts by weight of polyoxyethylene coconut oil fatty acid ethanolamide (PROFAN ME-20: made by Sanyo Kasei K.K.), and 0.6 parts by weight of ammonium chloride were added to the resin solution and stirred for five minutes. The resulting solution was applied onto the intermediate adhesive layer by a bar coater, and heated at 120° C. for two hours to form a surface layer of 9 $\mu$m thickness.

EXAMPLE 32

Base layer: A PET sheet with a thickness of 80 $\mu$m was used as a base layer.

Intermediate adhesive layer: None

Surface layer: A resin solution was prepared by dissolving 12 parts by weight of polyvinyl alcohol PVA-117 (made by Kuraray K.K.) in 188 parts by weigh of water. Four parts by weight of polyethylene glycol diacrylate, 0.2 parts by weight of polyoxyethylene coconut oil fatty acid ethanolamide (PROFAN ME-20: made by Sanyo Kasei K.K.), and one part by weight of potassium persulfate as a polymerization initiator were added to the resin solution and stirred for five minutes. The resulting solution was applied onto the intermediate adhesive layer by a bar coater, and heated at 120° C. for one hour to form a surface layer of 3 $\mu$m thickness.

EXAMPLE 33

Base layer: A PET sheet with a thickness of 100 $\mu$m was used as a base layer.

Intermediate adhesive layer: Polyoxyethylene nonyl phenyl ether (NONYPOLE 90: made by Sanyo Kasei K.K.) (0.1 parts by weight) was added to 100 parts by weight of an urethane-resin-water-dispersion (HUX-232: made by Asahi Denka Kogyo K.K.), and heated at 100° C. for one hour to form an intermediate adhesive layer of 5 $\mu$m thickness.

Surface layer: A resin solution was prepared by dissolving 12 parts by weight of polyvinyl alcohol CM-318 (made by Kuraray K.K.) in 188 parts by weigh of water. Amelamine-formaldehyde resin (SUMIREZ 613: made by Sumitomo Kagaku K.K.) (0.5 parts by weight), 0.3 parts by weight of polyethylene glycol dodecyl phenyl ether (DODECAPOLE 90: made by Sanyo Kasei K.K.), and 0.6 parts by weight of ammonium chloride were added to the resin solution and stirred for five minutes. The resulting solution was applied onto the intermediate adhesive layer by a bar coater, and heated at 120° C. for 120 minutes to form a surface layer of 10 $\mu$m thickness.

EXAMPLE 34

Base layer: A white PET sheet with a thickness of 100 $\mu$m (LUMILAR 100, E20: made by Toray K.K.) was used as a base layer.

Intermediate adhesive layer: A resin solution was prepared by dissolving 14 parts by weight of a polycarbonate resin in 186 parts by weight of 1,4-dioxane. Two parts by weight of a melamine-formaldehyde resin (SUMIREZ 613:

made by Sumitomo Kagaku K.K.) and 0.2 parts by weight of polyethylene glycol dodecyl phenyl ether (DODECAPOLE 90: made by Sanyo Kasei K.K.) were added to the resin solution and stirred. The resulting solution was applied onto the base layer by a bar coater, and heated at 100° C. for five minutes to form an intermediate adhesive layer of 2 μm thickness.

Surface layer: A resin solution was prepared by dissolving 20 parts by weight of polyvinyl alcohol PVA-205 (made by Kuraray K.K.) in 180 parts by weigh of water. One part by weight of sodium dodecylbenzenesulfonate was added to the resin solution and stirred for five minutes. The resulting solution was applied onto the intermediate adhesive layer by a bar coater, and heated at 120° C. for 20 minutes to form a surface layer of 7 μm thickness.

Evaluation

Images were formed on the image-recording media obtained in Examples 1 to 4, 8, 9 to 15, 18, 19, 21 to 25, 27 and 29 to 34 by use of electrophotographic copying machine (EP-4050: made by Minolta K.K.) available in the market. Images were formed on the image-recording media obtained in Examples 5, 6, 16, 17, and 28, by use of a laser beam printer (LP-1700: made by Epson K.K.) available in the market. Further, Images were formed on the image-recording media obtained in Examples 7, 20, and 26 by use of a full-color electrophotographic copying machine (CF900: made by Minolta K.K.) available in the market.

Images formed on the image-recording media were removed by use of the apparatus of FIG. 3, to evaluate printed image-removing properties. The printed image-removing properties were ranked as follows;

◎: 95% or more of the printed images were removed;

○: 80 to 95% of the printed images were removed;

x: less than 80% of the printed images were removed;

Resistance to brushing was examined by use of a simplified evaluation machine which was the same in construction as the apparatus of FIG. 3 except that the dryer was removed. Change in weight of the surface layer was measured after the image-recording medium was cycled through the simplified evaluation machine 10 times.

Then, a rate of change of weight of the surface layer was calculated as a percentage according to the formula:

$$(w_1-w_2)/w_1\times 100$$

$w_1$:weight of surface layer $w_2$:weight of surface layer after image-recording medium was cycled 10 times The smaller the rate of change, the higher is the resistance to brushing of the surface layer in the water-swollen conditions. The evaluation results are summarized in Table 1.

The operating conditions of the apparatus of FIG. 3 were as follows:

Brushing roller; the brush roller having a metal core diameter of 12 mm and having nylon brushing hair with length of 10 mm and thickness of 30 μm Tank water temperature: 30° C.

Paper-feeding speed: 1 cm/second

Immersion-time in tank water: 2 minutes

Brush-rotational speed/feeding speed in immersion=30 heat roller temperature: 110° C.

TABLE 1

| | Printed Image-removing Properties | Rate of Change of Weight (%) |
|---|---|---|
| Example 1 | ◎ | 5.2 |
| Example 2 | ◎ | 2.4 |
| Example 3 | ◎ | 3.3 |
| Example 4 | ◎ | 5.6 |
| Example 5 | ◎ | 6.4 |
| Example 6 | ○ | 4.7 |
| Example 7 | ◎ | 3.8 |
| Example 8 | ◎ | 6.0 |
| Example 9 | ○ | 1.2 |
| Example 10 | ○ | 6.8 |
| Example 11 | ◎ | 1.2 |
| Example 12 | ○ | 2.5 |
| Example 13 | ◎ | 2.2 |
| Example 14 | ◎ | 4.6 |
| Example 15 | ○ | 4.0 |
| Example 16 | ◎ | 0.4 |
| Example 17 | ◎ | 0.7 |
| Example 18 | ○ | 4.2 |
| Example 19 | ◎ | 4.6 |
| Example 20 | ○ | 1.6 |
| Example 21 | ◎ | 0.8 |
| Example 22 | ◎ | 2.4 |
| Example 23 | ○ | 1.6 |
| Example 24 | ○ | 3.2 |
| Example 25 | ○ | 2.2 |
| Example 26 | ○ | 0.8 |
| Example 27 | ○ | 2.4 |
| Example 28 | ○ | 1.3 |
| Example 29 | ◎ | 100 |
| Example 30 | ◎ | 95 |
| Example 31 | ◎ | 97 |
| Example 32 | ◎ | 100 |
| Example 33 | ◎ | 92 |
| Example 34 | ◎ | 100 |

What is claimed is:

1. A recyclable image recording medium comprising:

a base layer;

an intermediate layer; and a water-swelling surface layer;

wherein the intermediate layer comprises an adhesive resin and a reactive compound having a functional group chemically bondable to the surface layer, and wherein the reactive compound is at least one compound selected from the group consisting of an isocyanate compound, a methylol compound, an aldehyde compound, an epoxy compound and an aziridine compound.

2. The recyclable image recording medium as set forth in claim 1, wherein the adhesive resin is at least one resin selected from the group consisting of an acrylic resin, a styrene resin, a polyester resin, a polycarbonate resin, a vinyl acetate resin, a vinyl chloride resin, and an urethane resin.

3. The recyclable image-recording medium as set forth in claim 1, wherein the reactive compound is in solid form at ambient temperatures or in liquid form at ambient temperatures.

4. The recyclable image-recording medium as set forth in claim 1, wherein the surface layer comprises a water-swelling resin having at least one functional group selected from the group consisting of a hydroxyl group, an amino group, an amide group, a thiol group, a carboxyl group, and a sulfonic group.

5. The recyclable image-recording medium as set forth in claim 1, wherein the surface layer comprises a crosslinked water-soluble resin.

6. The recyclable image-recording medium as set forth in claim 7, wherein the water-soluble resin is cross-linked in the presence of a crosslinking agent, the crosslinking agent being the same compound as the reactive compound contained in the intermediate layer.

7. The recyclable image-recording medium as set forth in claim 1, wherein the surface layer comprises a water-soluble resin and a water-insoluble component.

8. The recyclable image-recording medium as set forth in claim 1, wherein the surface layer and/or the intermediate layer comprise(s) agglomerations of particles that are not smaller than 5 μm and not larger than 30 μm in size.

9. A recyclable image-recording medium comprising:

a base layer;

an adhesive intermediate layer on the base layer; and a surface layer comprising a water-swelling resin on the intermediate layer;

the surface layer being formed by using an aqueous solution containing a water-soluble resin dissolved and/or dispersed therein, where in the intermediate layer comprises an adhesive resin and a reactive compound having a functional group chemically bondable to the surface layer, and wherein the reactive compound is at least one compound selected from the group consisting of an isocyanate compound, a methylol compound, an aldehyde compound, an epoxy compound and an aziridine compound.

10. The recyclable image-recording medium as set forth in claim, 9, wherein the water-soluble resin is crosslinked by a water-soluble or hydrophilic crosslinking agent.

11. The recyclable image-recording medium as set forth in claim 9, wherein the surface layer comprises a water-insoluble component in the water-soluable resin, the water-insoluble component being obtained by polymerizing a water-soluble or hydrophilic polymerizable monomer and/or polymerizable oligomer.

12. The recyclable image-recording medium as set forth in claim 9, wherein the intermediate layer is formed by use of an aqueous solution containing a water-soluble or hydrophilic adhesive resin.

13. The recyclable image-recording medium as set forth in claim 9, wherein the intermediate layer is formed by use of an aqueous solution containing a water-soluble or hydrophilic reactive compound with a functional group chemically bondable to the water-soluble resin contained in the surface layer.

14. A method of manufacturing a recyclable image-recording medium, comprising the steps of:

forming an intermediate layer on a base layer by using an adhesive material; and forming a water-swelling surface layer on the intermediate layer by using an aqueous solution containing a water-soluble resin dissolved and/or dispersed in water, wherein the intermediate layer comprises an adhesive resin and a reactive compound having a functional group chemically bondable to the surface layer, and wherein the reactive compound is at least one compound selected from the group consisting of an isocyanate compound, a methylol compound, an aldehyde compound, an epoxy compound, and an aziridine compound.

15. The manufacturing method as set forth in claim 14, wherein the intermediate layer is formed by using an aqueous solution with an adhesive resin material dissolved or dispersed therein.

16. The manufacturing method as set forth in claim 19, wherein the intermediate layer is formed using an aqueous solution containing therein a water-soluble or hydrophilic reactive compound that has a functional group chemically bondable to the water-soluble resin contained in the surface layer.

17. A method for removing a printed material from an image-recording medium, comprising the steps of:

feeding an aqueous solvent to a surface layer of the image-recording medium with images printed thereon to swell the surface layer, the image-recording medium comprising a base layer; an intermediate layer; and a water-swelling surface layer; and the intermediate layer comprising a reactive compound having a functional group chemically bondable to the surface layer; and removing the printed material from the swollen surface layer by contacting the surface layer with a solid treating member.

18. The method as set forth in claim 17, further comprising the step of rinsing the image-recording medium with an aqueous liquid.

19. The method as set forth in claim 18, wherein the aqueous liquid contains a surface active agent.

20. The method as set forth in claim 17, wherein the solid treating member is selected from the group consisting of a brush, a blade, or a cloth.

21. A recyclable image-recording medium comprising:

a base layer;

an intermediate layer; and a water-swelling surface layer;

wherein the intermediate layer comprises a reactive compound having a functional group chemically bondable to the surface layer and no organic solvent, and wherein the reactive compound is at least one compound selected from the group consisting of an isocyanate compound, a methylol compound, an aldehyde compound, an epoxy compound, and an aziridine compound.

22. A recyclable image-recording medium comprising:

a base layer;

an adhesive intermediate layer on the base layer having no organic solvent and formed from a aqueous solution containing a water-soluble or hydrophilic compound and no organic solvent; and a surface layer comprising a water-swelling resin on the intermediate layer;

the surface layer being formed by using an aqueous solution containing a water-soluble resin dissolved and/or dispersed therein, and wherein the intermediate layer comprises a reactive compound selected from the group consisting of an isocyanate compound, a methylol compound, an aldehyde compound, an epoxy compound, and an aziridine compound.

* * * * *